United States Patent
Ko et al.

(10) Patent No.: US 10,910,633 B2
(45) Date of Patent: *Feb. 2, 2021

(54) NONAQUEOUS ELECTROLYTE SECONDARY BATTERY

(71) Applicant: Panasonic Intellectual Property Management Co., Ltd., Osaka (JP)

(72) Inventors: Takashi Ko, Hyogo (JP); Fumiharu Niina, Hyogo (JP); Katsunori Yanagida, Hyogo (JP); Yasunori Baba, Hyogo (JP); Yuki Morikawa, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/483,837

(22) PCT Filed: Jan. 26, 2018

(86) PCT No.: PCT/JP2018/002389
§ 371 (c)(1),
(2) Date: Aug. 6, 2019

(87) PCT Pub. No.: WO2018/150843
PCT Pub. Date: Aug. 23, 2018

(65) Prior Publication Data
US 2020/0014023 A1 Jan. 9, 2020

(30) Foreign Application Priority Data
Feb. 14, 2017 (JP) .................. 2017-025011

(51) Int. Cl.
| | | |
|---|---|---|
| *H01M 4/131* | (2010.01) | |
| *H01M 4/133* | (2010.01) | |
| *H01M 4/525* | (2010.01) | |
| *H01M 4/587* | (2010.01) | |
| *H01M 10/0525* | (2010.01) | |
| *H01M 4/505* | (2010.01) | |
| *H01M 4/583* | (2010.01) | |

(52) U.S. Cl.
CPC .......... *H01M 4/133* (2013.01); *H01M 4/131* (2013.01); *H01M 4/505* (2013.01); *H01M 4/525* (2013.01); *H01M 4/583* (2013.01); *H01M 10/0525* (2013.01)

(58) Field of Classification Search
CPC .... H01M 4/131; H01M 10/0567; H01M 4/62; H01M 4/485; H01M 4/13; H01M 10/052; H01M 4/36; H01M 4/133; H01M 4/505; H01M 4/525; H01M 4/587; H01M 10/0525; H01M 10/0568; H01M 4/364; Y02E 60/10; Y02T 10/70

See application file for complete search history.

(56) References Cited

U.S. PATENT DOCUMENTS

| | | | |
|---|---|---|---|
| 6,878,489 B2 * | 4/2005 | Nanjundaswamy | H01M 4/34 429/219 |
| 2006/0134521 A1 | 6/2006 | Shima | |
| 2008/0081262 A1 | 4/2008 | Kitao et al. | |
| 2013/0330613 A1 * | 12/2013 | Saruwatari | H01M 4/661 429/211 |
| 2014/0356718 A1 | 12/2014 | Ito et al. | |
| 2018/0219212 A1 * | 8/2018 | Seol | H01M 10/0525 |

FOREIGN PATENT DOCUMENTS

| | | |
|---|---|---|
| JP | 2005-123179 A | 5/2005 |
| JP | 2008-91236 A | 4/2008 |
| JP | 2011-91005 A | 5/2011 |
| JP | 2015-26594 A | 2/2015 |
| WO | 2013/115390 A1 | 8/2013 |

OTHER PUBLICATIONS

International Search Report dated Apr. 24, 2018, issued in counterpart International Application No. PCT/JP2018/002389 (2 pages).

* cited by examiner

*Primary Examiner* — Muhammad S Siddiquee

(74) *Attorney, Agent, or Firm* — Westerman, Hattori, Daniels & Adrian, LLP

(57) ABSTRACT

A nonaqueous electrolyte secondary battery in which low-crystalline carbon-covered graphite is used as negative electrode active material, wherein a cobalt-containing lithium transitional metal oxide is used for: a first positive electrode active material in which the volume per unit mass of pores having a pore size of 100 nm or less is 8 mm³/g or greater; and a second positive electrode active material in which the volume per unit mass of pores having a pore size of 100 nm or less is 5 mm³/g or less.

6 Claims, 3 Drawing Sheets

US 10,910,633 B2

NONAQUEOUS ELECTROLYTE SECONDARY BATTERY

TECHNICAL FIELD

The present disclosure relates to a non-aqueous electrolyte secondary battery.

BACKGROUND

On mobile digital assistants such as mobile phones, laptop computers, and smartphones, reduction in size and weight has been rapidly progressing in recent years, and a larger capacity is demanded of their secondary batteries as a power source for driving. A non-aqueous electrolyte secondary battery, which achieves charge and discharge by movement of lithium ions between positive and negative electrodes, has a high energy density and a large capacity, and is thus used widely as a power source for driving mobile digital assistants.

More recently, a non-aqueous electrolyte secondary battery has attracted attention as a power source for engines of electric tools, electric vehicles (EV), hybrid electric vehicles (HEV, PHEV) and the like, and thus wider spread use thereof is expected. Of such power sources for engines, demanded are a large capacity that enables long time use, improvement in output characteristics when charge and discharge are carried out repeatedly in a relatively short time, and improvement in durability characteristics that enable repetitive usage for a long time period.

For example, Patent Literature 1 discloses a non-aqueous electrolyte secondary battery which uses a low-crystallinity carbon-coated graphite for its negative electrode active material and which has a non-aqueous electrolyte solution using a mixed solvent containing propylene carbonate and chain carbonate as a non-aqueous solvent of the non-aqueous electrolyte solution and containing a lithium salt having an oxalate complex as an anion. Patent Literature 1 contends that by using the low-crystallinity carbon-coated graphite, a sufficiently high energy density can be attained and the contact of the graphite with the non-aqueous electrolyte solution is suppressed; and by incorporating the lithium salt having an oxalate complex as an anion in the non-aqueous electrolyte solution, the exfoliation of the low-crystallinity carbon from the surface of the graphite is suppressed; excellent charge and discharge cycle characteristics can thereby be attained.

CITATION LIST

Patent Literature

Patent Literature 1: Japanese Patent Laid-Open Publication No. 2008-91236

SUMMARY

The above conventional technology, however, in the case where the charge and discharge cycle is further repeated, cannot sufficiently suppress the exfoliation of the low-crystallinity carbon from the surface of the graphite of the negative electrode active material and cannot provide satisfactory charge and discharge cycle characteristics in some cases.

An object of the present disclosure is to provide a non-aqueous electrolyte secondary battery improved in the durability to the charge and discharge cycles.

A non-aqueous electrolyte secondary battery of one aspect of the present disclosure comprises a positive electrode having a positive electrode mixture layer containing a first positive electrode active material and a second positive electrode active material, a negative electrode having a negative electrode mixture layer containing a low-crystallinity carbon-coated graphite as a negative electrode active material, and a non-aqueous electrolyte containing a lithium salt having an oxalate complex as an anion, wherein the first positive electrode active material is a cobalt-containing lithium transition metal oxide, and has a pore volume, of pores each having a pore diameter of 100 nm or less, per mass of 8 mm$^3$/g or more; the second positive electrode active material has a pore volume, of pores each having a pore diameter of 100 nm or less, per mass of 5 mm$^3$/g or less; the pore volume, of pores each having a pore diameter of 100 nm or less, per mass of the first positive electrode active material is 4 or more times the pore volume, of pores each having a pore diameter of 100 nm or less, per mass of the second positive electrode active material; the content of the first positive electrode active material is 30 mass % or less based on the total amount of the first positive electrode active material and the second positive electrode active material; and the lithium salt having an oxalate complex as an anion is represented by the general formula: Li[M(C$_2$O$_4$)$_x$R$_y$], wherein M is B or P, R is a group selected from a halogen, an alkyl group or a halogen-substituted alkyl group, x is a positive integer, and y is 0 or a positive integer.

According to the non-aqueous electrolyte secondary battery as one aspect of the present disclosure, the durability to the charge and discharge cycles is enabled to be improved.

DESCRIPTION OF EMBODIMENTS

As a result of exhaustive studies, the present inventors have found that a non-aqueous electrolyte secondary battery comprising a negative electrode having a negative electrode mixture layer containing a low-crystallinity carbon-coated graphite as a negative electrode active material, and a non-aqueous electrolyte containing a lithium salt having an oxalate complex as an anion, the durability to the charge and discharge cycles can be improved in the case where its positive electrode has a positive electrode mixture layer containing a first positive electrode active material being a cobalt-containing lithium transition metal oxide and a second positive electrode active material; the pore volumes, of pores each having a pore diameter of 100 nm or less, per mass of the first positive electrode active material and the second electrode active material are each specified; and the content of the first positive electrode active material is 30 mass % or less based on total amount of the first positive electrode active material and the second electrode active material. In the non-aqueous electrolyte secondary battery of the present disclosure, as described in detail below, in the charge process, the cobalt-containing lithium transition metal oxide (first positive electrode active material) takes a highly oxidized state and assumes a state of having a high reaction activity. On repetition of charge and discharge, Co ions dissolve out from the first positive electrode active material into the non-aqueous electrolyte and migrate to the negative electrode. Here, the charge and discharge cycle characteristics are improved in the non-aqueous electrolyte secondary battery of the present disclosure conceivably because functional groups on the low-crystallinity carbon surface of the negative electrode active material, decomposition products originated from the lithium salt having an oxalate complex as an anion contained in the non-aqueous electrolyte, and the Co ions act to form a film on the low-crystallinity carbon-coated graphite and prevent the exfoliation of the low-crystallinity carbon from the graphite.

Hereinafter, with reference to the drawings, one example of embodiments of the present disclosure will be described in detail. The non-aqueous electrolyte secondary battery of the present disclosure is not limited to the embodiments described below. The drawings referred for the description of the embodiments are schematically illustrated, and the dimensions and the like of components should be determined in consideration of the description below.

[Non-Aqueous Electrolyte Secondary Battery]

Figure 1:
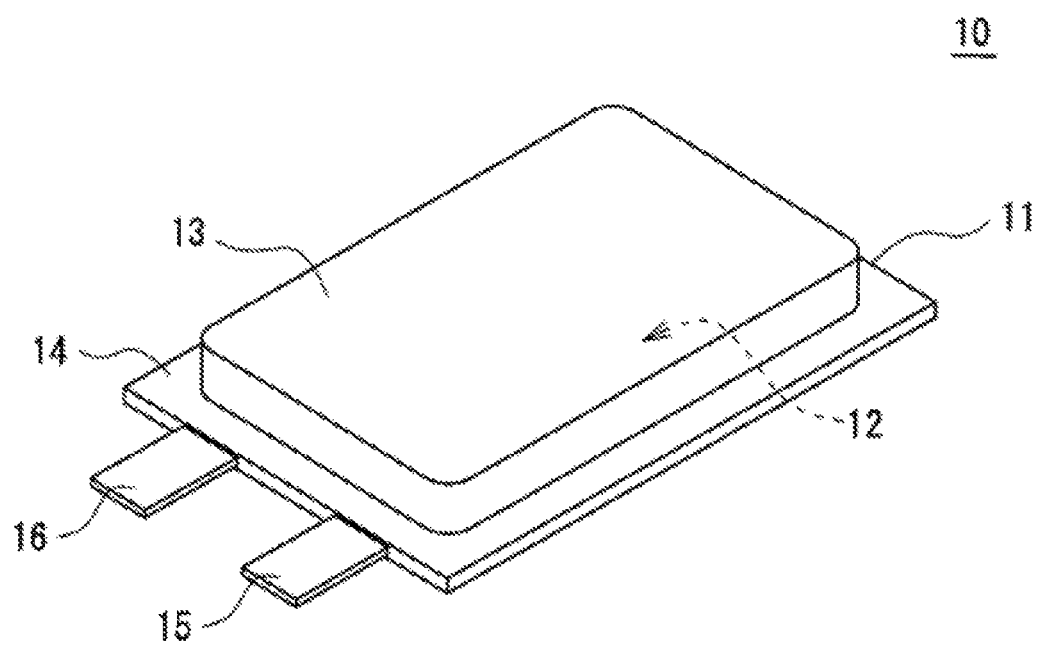
FIG. 1 is a perspective view schematically showing a non-aqueous electrolyte secondary battery as one exemplary embodiment.

Using FIG. 1 and FIG. 2, the configuration of a non-aqueous electrolyte secondary battery 10 will be described. FIG. 1 is a perspective view of the non-aqueous electrolyte secondary battery 10 as one example of the embodiments. As exemplified in FIG. 1, the non-aqueous electrolyte secondary battery 10 includes a battery case 11, and a power generation element housed in the battery case 11. The power generation element includes an electrode assembly 12 having a wound structure and a non-aqueous electrolyte (not shown). A preferred example of the non-aqueous electrolyte secondary battery 10 is a lithium ion battery.

The battery case 11 includes, for example, two laminate sheets. It is preferable to use sheets, each provided with resin layers formed on both sides of a metal layer, and each of the resin layers in contact with each other is preferably composed of a resin capable of being thermo-compression bonded. The metal layer is, for example, a thin film layer of aluminum, and has a function of preventing permeation of moisture or the like. An exterior body housing the power generation element is not limited to one configured by a laminate sheet, and may be a metallic case in a shape, such as a cylindrical shape (cylindrical battery), a rectangular shape (rectangular battery), and a coin shape (coin battery).

The battery case 11 includes, for example, a housing part 13 for storing the above-described power generation element, and a sealed part 14 formed around the periphery of the housing part 13. The housing part 13 is formed, for example, in such a manner that one of the laminate sheets, facing each other, is subjected to drawing to be formed in a projecting shape projecting to the opposite side to the other laminate sheet. The sealed part 14 is formed, for example, by thermally bonding respective end parts of the laminate sheets, to seal the internal space of the housing part 13 in which the power generation element is housed.

The non-aqueous electrolyte secondary battery 10 includes a pair of electrode terminals (a positive electrode terminal 15 and a negative electrode terminal 16) led out from the battery case 11. The positive electrode terminal 15 and the negative electrode terminal 16 are led out from an end part of the battery case 11. Each of the positive electrode terminal 15 and the negative electrode terminal 16 is, for example, a substantially flat plate-like body, is bonded to each of the laminate sheets at the sealed part 14, and is led out, through the sealed part 14 from between the respective films to the outside of the battery case 11.

Figure 2:
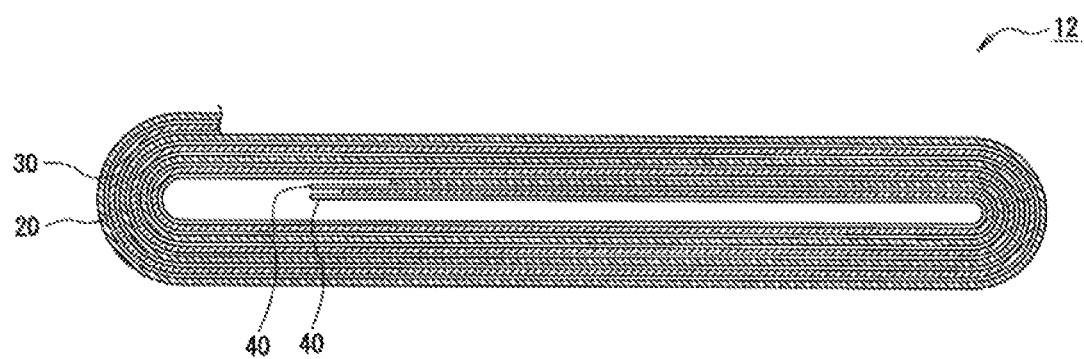
FIG. 2 is a sectional view showing an electrode assembly configuring the non-aqueous electrolyte secondary battery as one exemplary embodiment.

FIG. 2 is a sectional view of an electrode assembly 12 included in the non-aqueous electrolyte secondary battery 10. As shown in FIG. 2, the electrode assembly 12 has a wound structure in which a positive electrode 20 and a negative electrode 30 are wound together with a separator 40 therebetween. The electrode assembly 12 has a flat shape formed by being press-molded from a direction orthogonal to the center axis of the wound structure. The structure of the electrode assembly is not limited to the wound structure, and a plurality of positive electrodes and a plurality of negative electrodes may be alternately laminated with separators interposed therebetween.

Hereinafter, each of the components, particularly the positive electrode 20 and the negative electrode 30, of the non-aqueous electrolyte secondary battery 10 will be described.

[Positive Electrode]

The positive electrode 20 for a non-aqueous electrolyte secondary battery includes, for example, a positive electrode collector such as metal foil and a positive electrode mixture layer formed on the positive electrode collector. Foil of a metal, such as aluminum, that is stable in the electric potential range of the positive electrode 20, a film with such a metal disposed as outer layer, and the like can be used for the positive electrode collector. The positive electrode mixture layer contains a positive electrode active material, a conductive agent and a binder. The positive electrode 20 can be produced by, for example, applying a positive electrode mixture slurry containing the positive electrode active material, conductive agent, the binder and other components to the positive electrode collector, diving the resulting applying film, and rolling the resulting product to form the positive electrode mixture layer on both sides of the collector.

Examples of the conductive agent included in the positive electrode mixture layer include carbon materials such as carbon black, acetylene black, Ketjenblack and graphite. These may be used singly or in combinations of two or more thereof.

Examples of the binder included in the positive electrode mixture layer include fluoro resins such as polytetrafluoroethylene (PTFE) and poly (vinylidene fluoride) (PVdF), polyacrylonitrile (PAN), poly-imides, acryl resins and polyolefins, and others. These resins may be combined with carboxymethyl cellulose (CMC) or a salt thereof, poly (ethylene oxide) (PEO), or the like. These may be used singly or in combinations of two or more thereof.

The positive electrode mixture layer contains the first positive electrode active material and the second positive electrode active material, as the positive electrode active material. The first positive electrode active material is a cobalt-containing lithium transition metal oxide, and has a pore volume, of pores each having a pore diameter of 100 nm or less, per mass of 8 $mm^3/g$ or more. The second positive electrode active material has a pore volume, of pores each having a pore diameter of 100 nm or less, per mass of 5 $mm^3/g$ or less. The ratio of the pore volume, of pores each having a pore diameter of 100 nm or less, per mass of the first positive electrode active material to the pore volume, of pores each having a pore diameter of 100 nm or less, per mass of the second positive electrode active material, is 4 times or more. In addition, the content of the first positive electrode active material is 30 mass % or less, based on the total amount of the first positive electrode active material and the second positive electrode active material.

In the present specification, "a pore volume, of pores each having a pore diameter of 100 nm or less, per mass" of the positive electrode active material is also referred to as a "100 nm or less pores volume", and "the ratio of the pore volume, of pores each having a pore diameter of 100 nm or less, per mass of the first positive electrode active material to the pore volume, of pores each having a pore diameter of 100 nm or less, per mass of the second positive electrode active material" is also referred to as "the first/second pore volume ratio".

The 100 nm or less pores volume of the positive electrode active material can be measured according to a well-known method, and for example, a pore distribution curve is prepared according to the BJH method based on the measurement results of the amount of nitrogen adsorbed on a positive electrode active material, with respect to the nitrogen gas pressure as determined according to the nitrogen adsorption method, and the total volume of pores having a pore diameter within a range of 100 nm or less is determined by summing up the volumes of 100 nm or less, pores of the positive electrode active material. The BJH method is a method of in which a pore volume corresponding to a pore diameter is calculated using a pore model having a cylindrical shape to determine a pore distribution. The pore distribution according to the BJH method can be determined using, for example, a device for measuring an amount of a gas absorbed (manufactured by Quantachrome Corporation).

In the positive electrode active material, when the pore volume, of pores each having a pore diameter of 100 nm or less, per mass is large, the effective reaction area increases and the in-solid diffusion distance of Li ions shortens. Since the positive electrode 20 according to the present embodiment contains the first positive electrode active material having a 100 nm or less pores volume of 8 $mm^3/g$ or more and the second positive electrode active material having a 100 nm or less pores volume of 5 $mm^3/g$ or less, the charge reaction on the positive electrode side is generated preferentially on the first positive electrode active material having a larger effective reaction area and a shorter in-solid diffusion distance. That is, there arises such a state that the charge reaction is inclined to the first positive electrode active material in the positive electrode mixture layer. Further since the content (A) of the first positive electrode active material is 30 mass % or less (0<A≤30 mass %) based on the total amount of the first positive electrode active material and the second positive electrode active material (the content of the first positive electrode active material is lower), in the charge reaction, a load exerted to the first positive electrode active material becomes high. It is conceivable that consequently, since the first positive electrode active material in the charge reaction assumes a more highly oxidized state than the second positive electrode active material to raise the reaction activity, the surface of the first positive electrode active material deteriorates and Co ions dissolves out from the first positive electrode active material having Co atoms. Then, in the case where the positive electrode active material contains only the first positive electrode active material having a 100 nm or less pores volume of 8 $mm^3/g$ or more, it becomes easy for the charge reaction to occur uniformly in the entire region of the positive electrode mixture layer, and there becomes difficult the occurrence of the state that the charge reaction is inclined only to a part of the positive electrode active material in the positive electrode mixture layer. It is conceivable that therefore, in the case where the positive electrode active material contains only the first positive electrode active material, the amount of the positive electrode active material assuming a highly oxidized state is very small and there becomes difficult the occurrence of the dissolving-out of Co ions from the first positive electrode active material.

In the first positive electrode active material and the second positive electrode active material, however, the first/second pore volume ratio needs to be 4 times or more. When the first/second pore volume ratio is less than 4 times, it is conceivable that since the 100 nm or less pores volume of the first positive electrode active material is near to the 100 nm or less pores volume of the second positive electrode active material, it is difficult for the charge reaction on the positive electrode side to occur preferentially on the first positive electrode active material, and it becomes difficult for the first positive electrode active material to assume a highly oxidized state.

By thus making the 100 nm or less pores volumes, the contents and the first/second pore volume ratio of the first positive electrode active material and the second positive electrode active material in the ranges specified in the present embodiment, accompanying the charge and discharge cycles, Co ions dissolves out from the first positive electrode active material into the non-aqueous electrolyte. The Co ions dissolved out into the non-aqueous electrolyte migrate and reach the negative electrode. Then, functional groups on the low-crystallinity carbon surface of the negative electrode active material, decomposition products originated from the lithium salt having an oxalate complex as an anion contained in the non-aqueous electrolyte and the Co ions react to thereby form a chemically stable film on the surface of the low-crystallinity carbon-coated graphite. It is conceivable that the film can follow expansion and contraction of the graphite in the charge and discharge reaction. It is conceivable that hence, in the non-aqueous electrolyte secondary battery of the present disclosure, even when the charge and discharge cycle is repeated, the exfoliation of the low-crystallinity carbon from the graphite is suppressed and the durability to the charge and discharge cycles is improved.

The content (A) of the first positive electrode active material suffices if being 30 mass % or less (0<A≤30 mass %) based on the total amount of the first positive electrode active material and the second positive electrode active material, but from the viewpoint of improvement in the durability to the charge and discharge cycles, and otherwise, the content of the first positive electrode active material is, based on the total amount of the first positive electrode active material and the second positive electrode active material, preferably 3 mass % or more and 30 mass % or less and more preferably 5 mass % or more and 30 mass % or less. The content is especially preferably 5 mass % or more and 20 mass % or less.

The upper limit of the 100 nm or less pores volume of the first positive electrode active material is not especially limited, but is, for example, preferably 100 $mm^3/g$ or less and more preferably 50 $mm^3/g$ or less. Further the 100 nm or less pores volume of the first positive electrode active material is preferably 10 $mm^3/g$ or more and more preferably 15 $mm^3/g$ or more. The lower limit of the 100 nm or less pores volume of the second positive electrode active material is not especially limited, but is 0 $mm^3/g$ or more. Further the 100 nm or less pores volume of the second positive electrode active material is more preferably 3 $mm^3/g$ or less and still more preferably 2 $mm^3/g$ or less.

The first positive electrode active material and the second positive electrode active material are each preferably a lamellar lithium transition metal oxide, which has a lamellar crystal structure. Examples of the first positive electrode active material include lamellar lithium transition metal oxides represented by the general formula (1): $Li_{1+x}Co_aM_bO_{2+c}$, wherein x, a, b and c satisfies the conditions: a+b=1, −0.2≤x≤0.4, 0<a≤1 and −0.1≤c≤0.4, and M is a metal element including at least one element selected from the group consisting of nickel (Ni), manganese (Mn) and aluminum (Al). Examples of the second positive electrode active material include lamellar lithium transition metal oxides represented by the general formula (2): $Li_{1+x}M_aO_{2+b}$, wherein x, a and b meet the conditions: a=1, −0.2≤x≤0.4 and −0.1≤b≤0.4; and M is a metal element including at least one element selected from the group consisting of nickel (Ni), cobalt (Co), manganese (Mn) and aluminum (Al). It is easy for the lamellar lithium transition metal oxide to assume a highly oxidized state when lithium ions are abstracted in the charge reaction. As the lamellar lithium transition metal oxide, lithium nickel cobalt manganese oxide represented by the above general formulae (1) or (2) and including Ni, Co and Mn as M is particularly preferable.

It is preferable that the molar ratio of cobalt to the total molar amount of metal elements excluding lithium in the first positive electrode active material is higher than the molar ratio of cobalt to the total molar amount of metal elements excluding lithium in the second positive electrode active material. In the case of this constitution, the first positive electrode active material, having a higher molar ratio of cobalt, has a higher in-solid diffusibility of Li ions than the second positive electrode active material and the load exerted on the first positive electrode active material in charging becomes larger. Hence, in charging, the first positive electrode active material assumes a more highly oxidized state than the second positive electrode active material, so that dissolving-out of Co ions from the first positive electrode active material is promoted and it becomes easy for the above film to be formed on the low-crystallinity carbon-coated graphite.

The molar ratio, of cobalt to the total molar amount of metal elements excluding lithium in the first positive electrode active material is preferably 30 mol % or more and 60 mol % or less and more preferably 30 mol % or more and 40 mol % or less. The ratio Co/Ni of cobalt to nickel contained in the first positive electrode active material is preferably 1 or more.

The molar ratio of cobalt to the total molar amount of metal elements excluding lithium in the second positive electrode active material is preferably 10 mol % or more and 30 mol % or less and more preferably 10 mol % or more and 20 mol % or less. The ratio Co/Ni of cobalt to nickel contained in the second positive electrode active material is preferably 1 or less.

The lamellar lithium transition metal oxide may contain another additive element in addition to Ni, Co, Mn and Al, and examples thereof include an alkali metal element other than Li, a transition metal element other than Mn, Ni and Co, an alkaline earth metal element, a group 12 element, a group 13 element other than Al, and a group 14 element. Specific examples of the other additive element include zirconium (Zr), boron (B), magnesium (Mg), titanium (Ti), iron (Fe), copper (Cu), zinc (Zn), tin (Sn), sodium (Na), potassium (K), barium (Ba), strontium (Sr), calcium (Ca), tungsten (W), molybdenum (Mo), niobium (Nb) and silicon (Si).

The lamellar lithium transition metal oxide suitably contains Zr. This is because it is conceivable that, when containing Zr, the lamellar lithium transition metal oxide has a crystal structure to thereby improve durability of the positive electrode mixture layer at a high temperature and cycle characteristics. The Zr content of the lamellar lithium-containing transition metal oxide is preferably 0.05 mol % or more and 10 mol % or less, more preferably 0.1 mol % or more and 5 mol % or less and particularly preferably 0.2 mol % or more and 3 mol % or less, based on the total amount of metals excluding Li.

The compositions of compounds used as the positive electrode active material and the negative electrode active material can be measured by using an ICP atomic emission spectroscopic analyzer (e.g. "iCAP6300" (product name) manufactured by Thermo Fisher Scientific Inc.).

An example of a synthesis method of the lamellar lithium transition metal oxides used as the first positive electrode active material and the second electrode active material will be described. For example, secondary particles made by aggregation of primary particles of the lamellar lithium transition metal oxide represented by the above general formulae (1) or (2) can be synthesized by mixing oxides obtained by firing a lithium-containing compound such as lithium hydroxide and hydroxides containing metal elements excluding lithium in a target mixing ratio, and firing the resultant mixture. Firing the mixture is carried out in the atmosphere or in an oxygen stream. The firing temperature is, for example, about 500 to 1100° C., and the firing time is, for example, about 1 to 30 hours when the firing temperature is 500 to 1100° C.

The 100 nm or less pores volume of the lamellar lithium transition metal oxide used as the first positive electrode active material and the second positive electrode active material can be adjusted, for example, when the hydroxide containing Co and the above metal element M are prepared. The hydroxide containing Co and the above metal element M can be obtained, for example, by dropping an alkali aqueous solution such as a sodium hydroxide aqueous solution into an aqueous solution containing a compound of Co and the metal element M, and stirring the resultant, and at this time, the temperatures of the aqueous solutions, the time duration for dropping the alkali aqueous solution, the stirring rate, pH and other conditions are adjusted.

For example, the particle diameter of the first positive electrode active material and the second positive electrode active material are each preferably, bit not limited to, 2 μm or more and less than 30 μm in terms of the average particle diameter. If the average particle diameter of the first positive electrode active material and the average particle diameter of the second positive electrode active material are each less than 2 μm, the conductive path formed of the conductive agent in the positive electrode mixture layer may be impaired to thereby deteriorate the cycle characteristics. On the other hand, if the average particle diameter of the first positive electrode active material and the average particle diameter of the second positive electrode active material are each 30 μm or more, the reaction area may decrease to thereby deteriorate the loading characteristics. When the first positive electrode active material and the second positive electrode active material are secondary particles formed by aggregation of the primary particles, the average particle size of the secondary particles of the first positive electrode active material and the second positive electrode active material is preferably within the above range.

The average particle diameter of the positive electrode active material means a volume average particle diameter measured by the laser diffraction method, which means a median diameter at which the cumulative volume is 50% in the particle diameter distribution. The average particle diameter of the positive electrode active material can be measured using, for example, a laser diffraction scattering particle diameter distribution analyzer (manufactured by HORIBA, Ltd.).

The first positive electrode active material is preferably secondary particles formed by aggregation of primary particles. The average particle diameter of the primary particles is, for example, 50 nm or more and 500 nm or less and more preferably 100 nm of more and 400 nm or less. The second positive electrode active material is secondary particles formed by aggregation of primary particles, or single particles constituted of single primary particles only. In the case where the second positive electrode active material is the secondary particles, the average particle diameter of the primary particles is, for example, 600 nm or more and 2 μm or less. In the case where the second positive electrode active material is the single particles, the average particle diameter of the single particles (primary particles) is, for example, 2 μm or more and less than 30 μm. It is preferable that the second positive electrode active material is the single particles.

It is preferable that the average particle diameter of the primary particles in the first positive electrode active material is smaller than the average particle diameter of the primary particles in the second positive electrode active material. In the case of this constitution, the first positive electrode active material has a larger reaction area and has a higher in-solid diffusibility of Li ions than the second positive electrode active material and the load exerted on the first positive electrode active material in charging becomes larger. Hence, in charging, the first positive electrode active material assumes a more highly oxidized state than the second positive electrode active material, so that dissolving-out of Co ions from the first positive electrode active material is promoted and it becomes easy for the above film to be formed on the low-crystallinity carbon-coated graphite. In the case where the average particle diameter of the primary particles in the first positive electrode active material is 500 nm or less, in particular, it is easy for the above film to be formed on the low-crystallinity carbon-coated graphite.

The average particle diameter of primary particles in the case where the electrode active material is secondary particles can be taken, for example, as a value obtained by randomly sampling 100 particles from particles of the electrode active material observed by a scanning electron microscope (SEM), taking an average value of lengths of the major axis and the minor axis of the each particle as a particle diameter of the each particle, and averaging the particle diameters of the 100 particles.

In the case where the first positive electrode active material and the second electrode active material are secondary particles, the average particle diameters of primary particles constituting the secondary particles can be regulated, for example, by varying the firing temperature and the firing time in the synthesis method of hydroxides containing metal elements excluding lithium.

Figure 3:
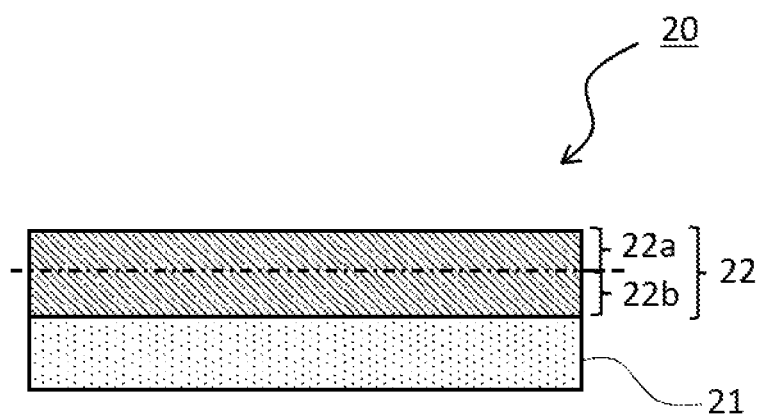
FIG. 3 is a partial schematic sectional view of a positive electrode to be used for a non-aqueous electrolyte secondary battery according to the present embodiment.

FIG. 3 is a partial schematic sectional view of a positive electrode to be used for a non-aqueous electrolyte secondary battery according to the present embodiment. In a positive electrode 20 according to the present embodiment, as illustrated in FIG. 3, a positive electrode mixture layer 22 is formed on one surface of a positive electrode collector 21. When a positive electrode mixture layer 22 is divided in the thickness direction into a surface-side region 22a and a collector-side region 22b, the content ratio of the first positive electrode active material contained in the surface-side region 22a of the positive electrode mixture layer 22 based on the total amount of the first positive electrode active material contained in the positive electrode mixture layer 22 is preferably 60 mass % or more and more preferably 65 mass % or more; and the upper limit is preferably 80 mass % or less. It is conceivable that thereby, the durability of the non-aqueous electrolyte secondary battery 10 to the charge and discharge cycles. Here, the surface-side region 22a of the positive electrode mixture layer 22 means a region from the surface (surface opposite to the surface contacting with the positive electrode collector 21) of the positive electrode mixture layer 22 to the center in the thickness direction, that is, a region on the surface side out of two regions into which the positive electrode mixture layer 22 is equally bisected in the thickness direction, or a region from the surface of the positive electrode mixture layer 22 to half of the thickness of the positive electrode mixture layer 22. Hereinafter, the ratio of the content of the first positive electrode active material contained in the surface-side region of the positive electrode mixture layer based on the total amount of the first positive electrode active material contained in the positive electrode mixture layer is sometimes referred to as the surface-side content ratio of the first positive electrode active material.

The measuring method for the surface-side content ratio of the first positive electrode active material may include, for example, the following method. Of the positive electrode including the positive electrode collector and the positive electrode mixture layer, a surface-side region of the positive electrode mixture layer is cut off by using a cutting tool or the like, on the basis of the thickness of the positive electrode mixture layer measured in advance, and this piece is subjected to centrifugal separation using a centrifugal separator so as to separate the first positive electrode active material; and thereafter, the mass the first positive electrode active material is measured. The positive electrode mixture layer present on the positive electrode collector side which is left in the positive electrode after the cut-off, is subjected to the same processing as described above so as to measure the mass of the first positive electrode active material. From these measurement results, the surface-side content of the first positive electrode active material is obtained.

As other methods, the followings may be listed. A cross section of the positive electrode mixture layer in the positive electrode 20 is formed by a Cross-section Polisher or the like, and based on a cross sectional image by observing the cross section with a scanning electron microscope (SEM), the number of particles and an average diameter of particles contained in the surface-side region and the whole of the positive electrode mixture layer. From these measurement results, a volume ratio of the first positive electrode active material contained in the surface-side region, based on the first positive electrode active material contained in the whole positive electrode mixture layer is calculated, to thereby obtain the surface-side content of the first positive electrode active material.

In the above-described measuring method for the surface-side content of the first positive electrode active material, when the surface-side region is cut off from the positive electrode mixture layer of the positive electrode, the cutting surface does not necessarily coincide with the center in the thickness direction of the positive electrode mixture layer; and cutting surface may be included within a range of 40% or more and 60% or less in the thickness direction of the positive electrode mixture layer. Furthermore, when there is a large difference between the total amount of a first mixture obtained by cutting off the positive electrode mixture layer present on the surface side and the total amount of a second mixture obtained by cutting off the positive electrode mixture layer present on the positive electrode collector side, the a value of the surface-side content of the first positive electrode active material may be corrected based on the total amount (mass) of each mixture.

The positive electrode 20 according to the present embodiment may be produced, for example, by mixing the first positive electrode active material, the second positive electrode active material, the conductive agent and a binder, and thereafter adding a disperse medium such as an N-methyl-2-pyrrolidone (NMP) so as to prepare a positive electrode mixture slurry, and subsequently applying the positive electrode mixture slurry on the positive electrode collector, and then drying the applying film, and thereafter rolling the resultant to thus form the positive electrode mixture layers on both surfaces of the collector.

The positive electrode 20 according to the present embodiment may be produced, for example, by a method including (1) a slurry preparation step of preparing a first positive electrode slurry that contains the first positive electrode active material, the second positive electrode active material, the conductive agent and the binder, and a second positive electrode slurry that contains the first positive electrode active material, the second positive electrode active material, the conductive agent and the binder, and has a different content between the first positive electrode active material and the second positive electrode active material from that of the first positive electrode slurry; (2) a first applying step of applying the first positive electrode slurry to the surface of the positive electrode collector so as to form a first applying layer; (3) a first drying step of drying the first applying layer formed on the positive electrode collector so as to form a first positive electrode mixture layer, (4) a second applying step of applying the second positive electrode slurry on the surface of the first positive electrode mixture layer so as to form a second applied layer; (5) a second drying step of drying the second applying layer so as to form a second positive electrode mixture layer; and (6) a rolling step of rolling the first positive electrode mixture layer and the second positive electrode mixture layer. At this time, the content of the first positive electrode active material in each of the first positive electrode slurry and the second positive electrode slurry, and the applying amount of the first positive electrode shiny and the second positive electrode slurry (i.e. the thicknesses of the first positive electrode mixture layer and the second positive electrode mixture layer), and others are adjusted such that the content of the first positive electrode active material contained in a region from the surface to the center in the thickness direction of the positive electrode mixture layer (a surface-side positive electrode mixture layer) is set to be 60 mass % or more based on the total amount of the first positive electrode active material contained in the positive electrode mixture layer.

The method of applying the first positive electrode slurry to the surface of the positive electrode collector in the first application step, and the method of applying the second positive electrode slurry to the surface of the first positive electrode mixture layer in the second application step are not particularly limited, and the application may be carried out by using a well-brown applying device, such as a gravure coater, a slit coater, or a die coater.

The positive electrode mixture layer may contain another positive electrode active material in addition to the first positive electrode active material and the second positive electrode active material. The percentage by mass of the first positive electrode active material and the second positive electrode active material is preferably, but not limited to, 10 mass % or more and 100 mass % or less, more preferably 20 mass % or more and 100 mass % or less and still more preferably 60 mass % or more and 100 mass % or less, based on the total amount of the positive electrode active material. A positive electrode active material other than the first positive electrode active material and the second positive electrode active material is not particularly limited as long as it is a compound that can reversibly intercalate and deintercalate lithium, and examples thereof include compounds having a crystal structure such as a layered structure, a spinel structure or an olivine structure, that can intercalate and deintercalate lithium ions while retaining its stable crystal structure.

[Negative Electrode]

The negative electrode 30 includes, for example, a negative electrode collector formed of a metal foil, for example, and a negative electrode mixture layer formed on the negative electrode collector. Foil of a metal, such as copper or a copper alloy, that is stable in the electric potential range of the negative electrode 30, a film with such a metal disposed on an outer layer, or the like can be used for the negative electrode collector. The negative electrode mixture layer contains a negative electrode active material and a binder. The negative electrode 30 can be produced, for example, by applying a negative electrode mixture slurry containing the negative electrode active material, the binder and other components to the negative electrode collector, drying the resultant applying film, and thereafter rolling the resulting product to form a negative electrode mixture layer on each side of the collector.

The negative electrode 30 according to the present embodiment contain the low-crystallinity carbon-coated graphite made by forming a au of a low-crystallinity carbon on the surface of a graphite as a negative electrode active material. The low-crystallinity carbon is a carbon material in an amorphous state or a microcrystallite turbostratic structure state, or a carbon material which does not have a spherical or flake shape but has a very fine particle diameter, which carbon materials have no developed graphite crystal structure. For example, a carbon material having an interplanar spacing d(002) by X-ray diffractometry of more than 0.340 mm is a low-crystallinity carbon. Further a carbon material having an average particle diameter of primary particles of 1 µm or less as observed and measured by a scanning electron microscope (SEM) or the like, is also a low-crystallinity carbon. Specific examples of the low-crystallinity carbon include hard carbon (non-graphitizable carbon), soft carbon (graphitizable carbon), carbon black such as acetylene black, Ketjen black, thermal black and furnace black, carbon fibers and active carbon.

As described above, by reaction of functional groups on the surface of a low-crystallinity carbon film of the low-crystallinity carbon-coated graphite, decomposition products originated from the lithium salt having an oxalate complex as an anion contained in the non-aqueous electrolyte and Co ions dissolved out from the first positive electrode active material into the non-aqueous electrolyte by repetition of charge and discharge, a film which is chemically stable and can follow expansion and contraction of the graphite in the charge and discharge reaction is formed on the surface of the low-crystallinity carbon-coated graphite. Such a film is formed only when the Co ions and the decomposition products are simultaneously present on the low-crystallinity carbon film, and it is conceivable that in a negative electrode active material using a graphite coated with no low-crystallinity carbon, since the presence rate of functional groups on the surface is low, a film effective for improvement in the cycle characteristics is not formed.

The low-crystallinity carbon film is formed, for example, on the entire surface of graphite particles. The thickness of the low-crystallinity carbon film is, for example, 10 to 200 nm, and is nearly uniform across the entire of the graphite particle surface. Methods of forming the low-crystallinity carbon film include a method of mixing coal tar, tar pitch, naphthalene, anthracene, phenanthrolene or the like with negative electrode active material particles and subjecting the mixture to a heat treatment (800 to 1,100° C.), and a chemical vapor deposition method (CVD method) using a hydrocarbon gas or the like. The proportion of the low-crystallinity carbon film to the graphite in the low-crystallinity carbon-coated graphite is, for example, 0.1 mass % or more and 20 mass % or less, preferably 0.5 mass % or more and 15 mass % or less and still more preferably 1 mass % or more and 10 mass % or less.

As negative electrode active materials, the negative electrode 30 may contain, other than a low-crystallinity carbon-coated graphite, a compound that can be reversibly intercalate and deintercalate lithium ions, like carbon materials such as natural graphite and artificial graphite, a metal that can be alloyed with lithium, such as Si and Sn, an alloy containing a metal element such as Si and Sn, and composite oxides. As negative electrode active materials, the negative electrode 30 may contain low-crystallinity carbon film particles coating a negative electrode active material other than the graphite, the single particles of the low-crystallinity carbon, and the like.

As the binder used for the negative electrode 30, any well-known binder can be used, and similarly to the case of the positive electrode 20, a fluorocarbon resin such as PTFE, PAN, a polyimide resin, an acrylic resin, a polyolefin resin and the like can be used. Examples of the binder used when the negative electrode mixture slurry is prepared using an aqueous solvent include CMC and its salts, styrene-butadiene rubber (SBR), poly(acrylic acid) (PAA) or its salts, and poly(vinyl alcohol) (PVA).

The negative electrode 30 according to the present embodiment is produced, for example, by mixing the negative electrode active material containing the low-crystallinity carbon-coated graphite, and the binder, and thereafter adding a disperse medium such as water or N-methyl-2-pyrrolidone (NMP) to thereby prepare a negative electrode mixture slurry, and then applying the negative electrode mixture slurry on the negative electrode collector, drying the resultant coated film, and thereafter rolling the resultant to thus form the negative electrode mixture layers on both surfaces of the collector. A method of applying the negative electrode mixture slurry on the surface of the negative electrode collector is not especially limited, and the application may be carried out by using a well-known applying device, such as a gravure coater, a slit coater, or a die coater.

[Non-Aqueous Electrolyte]

The non-aqueous electrolyte contains a non-aqueous solvent. Examples of the non-aqueous solvent used for the non-aqueous electrolyte include esters, ethers, nitriles, amides such as dimethylformamide, and mixed solvents of two or more thereof, and further a halogen-substituted product formed by replacing at least one of hydrogen atom of any of the above solvents with a halogen atom such as fluorine may also be used.

Examples of the esters that may be contained in the non-aqueous electrolyte include cyclic carbonate esters, chain carbonate esters and carboxylate esters. Specifically, examples thereof include cyclic carbonate esters such as ethylene carbonate (EC), propylene carbonate (PC), butylene carbonate and vinylene carbonate; chain carbonate esters such as dimethyl carbonate (DMC), methyl ethyl carbonate (MEC), diethyl carbonate (DEC), methyl propyl carbonate, ethyl propyl carbonate and methyl isopropyl carbonate; chain carboxylate esters such as methyl propionate (MP), ethyl propionate, methyl acetate, ethyl acetate and propyl acetate; and cyclic carboxylate esters such as γ-butyrolactone (GBL) and γ-valerolactone (GVL).

Examples of the ethers that may be contained in the non-aqueous electrolyte include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole and crown ethers; and chain ethers such as diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether and tetraethylene glycol dimethyl ether.

Examples of the nitriles that may be contained in the non-aqueous electrolyte include acetonitrile, propionitrile, butyronitrile, valeronitrile, n-heptanenitrile, succinonitrile, glutaronitrile, adiponitrile, pimelonitrile, 1,2,3-propanetricarbonitrile and 1,3,5-pentanehicarbonitrile.

Examples of the halogen-substituted product that may be contained in the non-aqueous electrolyte include fluorinated cyclic carbonate esters such as 4-fluoroethylene carbonate (FEC), fluorinated chain carbonate esters and fluorinated chain carboxylate esters such as methyl 3,3,3-trifluoropropionate (FMP).

The non-aqueous electrolyte contains a lithium salt having an oxalate complex as an anion. The lithium salt having an oxalate complex as an anion is represented by the general formula (4): $Li[M(C_2O_4)_xR_y]$, wherein M is B or P, R is a group selected from a halogen, an alkyl group (for example, an alkyl group having 1 to 11 carbon atoms) or a halogen-substituted alkyl group (the alkyl is, for example, an alkyl group having 1 to 11 carbon atoms), x is a positive integer, and y is 0 or a positive integer. The lithium salt specifically includes lithium bis(oxalato)borate ($Li[B(C_2O_4)_2]$), lithium-difluoro(oxalato)borate ($Li[B(C_2O_4)F_2]$), lithium-difluorobis(oxalato)phosphate ($Li[P(C_2O_4)_2F_2]$), lithium-tris(oxalato)phosphate ($Li[P(C_2O_4)_3]$) and lithium-tetrafluoro(oxalato)phosphate ($Li[P(C_2O_4)F_4]$). Among these, lithium bis(oxalato)borate ($Li[B(C_2O_4)_2]$) is preferable in the point of the effect of improving the durability to the charge and discharge cycles.

The concentration of the lithium salt having an oxalate complex as an anion in the non-aqueous electrolyte is, for example, preferably in the range of 0.01 mol/L to 0.2 mol/L and more preferably in the range of 0.02 mol/L to 0.1 mol/L. It is conceivable that by making the concentration of the lithium salt having an oxalate complex as an anion in the above range, a film having a suitable thickness is formed on the surface of the low-crystallinity carbon-coated graphite, and as compared with the case out of the above range, the durability to the charge and discharge cycles is enabled to be improved more.

The non-aqueous electrolyte, in the point of improving the ionic conductivity, preferably contains conventionally well-known lithium salts other than the lithium salt having an oxalate complex as an anion. The lithium salts specifically include $LiBF_4$, $LiClO_4$, $LiPF_6$, $LiAsF_6$, $LiSbF_6$, $LiAlCl_4$, $LiSCN$, $LiCF_3SO_3$, $LiC(C_2F_5SO_2)$, $LiCF_3CO_2$, $LiPF_{6-x}(C_nF_{2n+1})_x$ (wherein $1 \leq x \leq 6$, and n is 1 or 2), $LiB_{10}Cl_{10}$, LiCl, LiBr, LiI, chloroborane lithium, lithium lower aliphatic carboxylates, and $Li_2B_4O_7$, and imide salts such as $LiN(FSO_2)_2$ and $LiN(C_lF_{2l+1}SO_2)(C_mF_{2m+1}SO_2)$ wherein l and m are integers of 1 or more). The lithium salts may be used singly or in combinations of two or more thereof.

[Separator]

An ion-permeable and insulating porous sheet is used as the separator 40. Specific examples of the porous sheet include microporous thin film, woven fabric, and nonwoven fabric. Suitable examples of the material for the separator 40 include olefin resins such as polyethylene and polypropylene, and cellulose. The separator 40 may be a laminate including a cellulose fiber layer and a layer of fibers of a thermoplastic resin such as an olefin resin. The separator 40 may be a multi-layered separator including a polyethylene layer and a polypropylene layer, and a separator a surface of which is coated with a resin such as an aramid resin or inorganic fine particles such as alumina, titania may also be used as the separator 40.

EXAMPLES

Hereinafter, the present disclosure will be further described in more details specifically by way of Examples and Comparative Examples, but is not limited to the following Examples.

Example 1

[Production of Positive Electrode]

A lamellar lithium transition metal oxide represented by the composition formula: $Li_{1.054}Ni_{0.199}Co_{0.597}Mn_{0.199}Zr_{0.005}O_2$ (first positive electrode active material A1), and a lamellar lithium transition metal oxide represented by the composition formula: $Li_{1.067}Ni_{0.498}Co_{0.199}Mn_{0.299}Zr_{0.005}O_2$ (second positive electrode active material B1) were mixed in a mixing ratio of 30:70 to thereby obtain a mixture. The 100 nm or less pores volume of the first positive electrode active material A1 was 10 $mm^3/g$, and the 100 nm or less pores volume of the second positive electrode active material B1 was 2 $mm^3/g$, as measured according to the BJH method.

The above mixture, a carbon black (conductive agent) and a poly (vinylidene fluoride) (PVDF) (binder) were mixed in a mass ratio of 91:7:2. N-methyl-2-pyrrolidone (NMP) as a disperse medium was added to the resultant mixture, and stirred by using a mixer (T.K. HIVIS MIX, manufactured by Primix Corporation) to thereby prepare a positive electrode mixture slurry. Then, the positive electrode mixture sherry was applied on an aluminum foil that is a positive electrode collector, and the applying film was dried so as to form a positive electrode mixture layer. Thereafter the positive electrode mixture layer was rolled by rolling mill so as to produce a positive electrode formed with the positive electrode mixture on both surfaces of the aluminum foil. In the positive electrode, the content of the first positive electrode active material A1 was 30 mass % relative to the total amount of the first positive electrode active material A1 and the second positive electrode active material B1.

[Production of Negative Electrode]

As a negative electrode active material, a low-crystallinity carbon-coated graphite in which the surface of a graphite powder was coated with a low-crystallinity carbon (the amount of the low-crystallinity carbon coated was 9.5 mass % with respect to the graphite) was used. The low-crystallinity carbon-coated graphite, a carboxymethylcellulose sodium (CMC-Na) and a styrene-butadiene rubber (SBR) were mixed in a mass ratio of 98:1:1. Water was added to the resultant mixture and stirred by using a mixer (T.K. HIVIS MIX, manufactured by Primix Corp.) to thereby prepare a negative electrode mixture slurry. Then, the negative electrode mixture slurry was applied on a copper foil as a negative electrode collector, and the resultant coated film was dried and rolled by a rolling mill to thereby produce a negative electrode in which the negative electrode mixture layers were formed on both surfaces of the copper foil.

[Preparation of Non-Aqueous Electrolyte]

Propylene carbonate (PC), ethyl methyl carbonate (EMC) and dimethyl carbonate (DMC) were mixed in a volume ratio of 25:35:40. Then, $Li[B(C_2O_4)_2]$ and $LiPF_6$ were dissolved in the resultant mixed solvent so as to have concentrations of 0.05 mol/L and 1.2 mol/L, respectively.

[Production of Battery]

An aluminum lead was attached to the above positive electrode and a nickel lead was attached to the above negative electrode. A microporous polypropylene membrane was used as a separator, and the positive electrode and the negative electrode were spirally wound through the separator, and a press-molded wound-type electrode assembly was thereby produced. The electrode assembly was housed in a battery case formed by an aluminum laminate sheet; the above non-aqueous electrolyte was injected; thereafter, the opening of the battery case was sealed to thereby produce a laminate-type non-aqueous electrolyte secondary battery having a rated capacity of about 220 mAh.

Example 2

A laminate-type non-aqueous electrolyte secondary battery was produced through the same procedure as in Example 1, except for, in the production process of the negative electrode, using, as a negative electrode active material, a low-crystallinity carbon-coated graphite in which the amount of the low-crystallinity carbon coated was 6.5 mass % with respect to the graphite.

Example 3

A laminate-type non-aqueous electrolyte secondary battery was produced through the same procedure as in Example 1, except for, in the production process of the negative electrode, using, as a negative electrode active material, a low-crystallinity carbon-coated graphite in which the amount of the low-crystallinity carbon coated was 12.5 mass % with respect to the graphite.

Example 4

A laminate-type non-aqueous electrolyte secondary battery was produced through the same procedure as in Example 1, except for, in the production process of the positive electrode, using a lamellar lithium transition metal oxide (first positive electrode active material A2) represented by the composition formula: $Li_{1.054}Ni_{0.199}Co_{0.597}Mn_{0.199}Zr_{0.005}O_2$ in place of the first positive electrode active material A1. The 100 nm or less pores volume of the first positive electrode active material A2 measured by using the BJH method was 8 $mm^3/g$.

Comparative Example 1

A laminate-type non-aqueous electrolyte secondary battery was produced through the same procedure as in Example 4, except for, in the production process of the positive electrode, mixing the first positive electrode active material A2 and the second positive electrode active material B1 in a mass ratio of 40:60 to obtain the mixture. The content ratio of the first positive electrode active material A2 was 40 mass % based on the total amount of the first positive electrode active material A2 and the second positive electrode active material B1.

Comparative Example 2

A laminate-type non-aqueous electrolyte secondary battery was produced through the same procedure as in Example 1, except for, in the production process of the positive electrode, using a lamellar lithium transition metal oxide (first positive electrode active material A3) represented by the composition formula: $Li_{1.054}Ni_{0.199}Co_{0.597}Mn_{0.199}Zr_{0.005}O_2$ in place of the first positive electrode active material A1, and using a lamellar lithium transition metal oxide (second positive electrode active material B2) represented by the composition formula: $Li_{1.067}Ni_{0.498}Co_{0.199}Mn_{0.299}Zr_{0.005}O_2$ in place of the second positive electrode active material B1. The 100 nm or less pores volume of the first positive electrode active material A3 was 6 mm$^3$/g, and the 100 nm or less pores volume of the second positive electrode active material B2 was 1.5 mm$^3$/g, as measured by using the BJH method.

Comparative Example 3

A laminate-type non-aqueous electrolyte secondary battery was produced through the same procedure as in Example 4, except for, in the production process of the positive electrode, using a lamellar lithium transition metal oxide (second positive electrode, active material B3) represented by the composition formula: $Li_{1.067}Ni_{0.498}Co_{0.199}Mn_{0.299}Zr_{0.005}O_2$ in place of the second positive electrode active material B1. The 100 nm or less pores volume of the second positive electrode active material B3 measured by using the BJH method was 2.7 mm$^3$/g.

Comparative Example 4

A laminate-type non-aqueous electrolyte secondary battery was produced through the same procedure as in Example 1, except for, in the preparation process of the non-aqueous electrolyte, adding no $Li[B(C_2O_4)_2]$.

Comparative Example 5

A laminate-type non-aqueous electrolyte secondary battery was produced through the same procedure as in Example 1, except for, in the production process of the negative electrode, using, as a negative electrode active material, a graphite in place of the low-crystallinity carbon-coated graphite.

[Cycle Characteristic Test]

The initial discharge capacity of each battery produced in the above was measured. The battery was subjected to, under the condition of a battery temperature of 25° C., a constant-current charge at a current value of 800 mA up to 4.1 V and thereafter a constant-current discharge at a current value of 800 mA down to 2.5 V. The discharge capacity when the constant-current discharge was carried out was taken as an initial discharge capacity of the battery.

Then, the cycle characteristics test was carried out on each battery. The cycle test involved 1500-times repetition of a charge and discharge cycle under the temperature condition of 60° C., composed of a constant-current charge at a current value of 800 mA up to 4.1 V, a quiescent period of 15 min, a constant-current discharge at a current value of 800 mA down to 2.5 V, and a quiescent period of 15 min. After the 1,500 charge and discharge cycles, as in the initial discharge capacity, the measurement of the discharge capacity after the cycle characteristics test was carried out on each battery.

For each battery, the proportion (percentage) of the discharge capacity after the cycle characteristics test to the initial discharge capacity was calculated as a capacity retention rate, and the cycle characteristics of the battery were evaluated based on the capacity retention rate.

TABLE 1

| | First Positive Electrode Active Material | | Second Positive Electrode Active Material | | | Content Ratio of | | Low-Crystallinity | |
|---|---|---|---|---|---|---|---|---|---|
| | Number | 100 nm or less pores volume (mm$^3$/g) | Number | 100 nm or less pores volume (mm$^3$/g) | First/Second Pore Volume Ratio | First Positive Electrode Active Material (%) | Oxalato Salt | Carbon for Coating (%) | Capacity Retention Rate (%) |
| Example 1 | A1 | 10 | B1 | 2 | 5 | 30 | $Li[B(C_2O_4)_2]$ | 9.5 | 100 |
| Example 2 | A1 | 10 | B1 | 2 | 5 | 30 | $Li[B(C_2O_4)_2]$ | 6.5 | 102 |
| Example 3 | A1 | 10 | B1 | 2 | 5 | 30 | $Li[B(C_2O_4)_2]$ | 12.5 | 98 |
| Example 4 | A2 | 8 | B1 | 2 | 4 | 30 | $Li[B(C_2O_4)_2]$ | 9.5 | 98 |
| Comparative Example 1 | A2 | 8 | B1 | 2 | 4 | 40 | $Li[B(C_2O_4)_2]$ | 9.5 | 96 |
| Comparative Example 2 | A3 | 6 | B2 | 1.5 | 4 | 30 | $Li[B(C_2O_4)_2]$ | 9.5 | 95 |
| Comparative Example 3 | A2 | 8 | B3 | 2.7 | 3 | 30 | $Li[B(C_2O_4)_2]$ | 9.5 | 93 |
| Comparative Example 4 | A1 | 10 | B1 | 2 | 5 | 30 | — | 9.5 | 95 |
| Comparative Example 5 | A1 | 10 | B1 | 2 | 5 | 30 | $Li[B(C_2O_4)_2]$ | 0 | 94 |

As is clear from the results of Table 1, in the non-aqueous electrolyte secondary batteries using a low-crystallinity carbon-coated graphite as their negative electrode active material, the batteries of Examples 1 to 4, in which the first positive electrode active material being a Co-containing lithium transition metal oxide and having a 100 nm or less pores volume of 8 mm³/g or more and the second positive electrode active material having a 100 nm or less pores volume of 5 mm³/g or less were contained, the first/second pore volume ratio was 4 times or more; the positive electrode in which the content of the first positive electrode active material was 30 mass % or less based on the total amount of the first positive electrode active material and the second positive electrode active material was used; and the non-aqueous electrolyte containing the lithium salt having an oxalate complex as an anion was used, were remarkably superior in the capacity retention rate after the cycle characteristics test to the batteries of Comparative Examples 1 to 5, which did not meet one of the above constitutions.

Comparing the results of Examples 1 to 3, the batteries of Example 1 and Example 2, which used, as their negative electrode active material, a low-crystallinity carbon-coated graphite in which the amount of the low-crystallinity carbon coated was 10 mass % or less based on the graphite, exhibited a higher capacity retention rate and better durability to the charge and discharge cycles than the battery of Example 3, which was produced by the same method except for using, as the negative electrode active material, a low-crystallinity carbon-coated graphite in which the amount of the low-crystallinity carbon coated exceeded 10 mass % based on the graphite.

REFERENCE SIGNS LIST 10 non-aqueous electrolyte secondary battery
11 battery case
12 electrode assembly
13 housing part
14 sealed part
15 positive electrode terminal
16 negative electrode terminal
20 positive electrode
21 positive electrode collector
22 positive electrode mixture layer
22a surface-side region
22b collector-side region
30 negative electrode
40 separator

The invention claimed is:

1. A non-aqueous electrolyte secondary battery comprising:
    a positive electrode having a positive electrode mixture layer containing a first positive electrode active material and a second positive electrode active material;
    a negative electrode having a negative electrode mixture layer containing a low-crystallinity carbon-coated graphite as a negative electrode active material; and
    a non-aqueous electrolyte containing a lithium salt having an oxalate complex as an anion, wherein
    the first positive electrode active material is a cobalt-containing lithium transition metal oxide, and has a pore volume, of pores each having a pore diameter of 100 nm or less, per mass of 8 mm³/g or more;
    the second positive electrode active material has a pore volume, of pores each having a pore diameter of 100 nm or less, per mass of 5 mm³/g or less;
    the pore volume, of pores each having a pore diameter of 100 nm or less, per mass of the first positive electrode active material is 4 or more times the pore volume, of pores each having a pore diameter of 100 nm or less, per mass of the second positive electrode active material;
    the content of the first positive electrode active material is 30 mass % or less based on the total amount of the first positive electrode active material and the second positive electrode active material; and
    the lithium salt having an oxalate complex as an anion is represented by the general formula: $Li[M(C_2O_4)_xR_y]$, wherein M is B or P, R is a group selected from a halogen, an alkyl group or a halogen-substituted alkyl group, x is a positive integer, and y is 0 or a positive integer.

2. The non-aqueous electrolyte secondary battery according to claim 1, wherein
    the first positive electrode active material is a lamellar lithium transition metal oxide represented by the general formula: $Li_{1+x}Co_aM_bO_{2+c}$, wherein x, a, b and c meet the conditions: a+b=1, −0.2≤x≤0.4, 0<a≤1 and −0.1≤c≤0.4, and M is a metal element including at least one element selected from the group consisting of Ni, Mn and Al; and
    the second positive electrode active material is a lamellar lithium transition metal oxide represented by the general formula: $Li_{1+x}M_aO_{2+b}$, wherein x, a and b meet the conditions: a=1, −0.2≤x≤0.4 and −0.1≤b≤0.4, and M is a metal element including at least one element selected from the group consisting of Ni, Co, Mn and Al.

3. The non-aqueous electrolyte secondary battery according to claim 1, wherein a molar ratio of cobalt to the total molar amount of metal elements excluding lithium in the first positive electrode active material is higher than a molar ratio of cobalt to the total molar amount of metal elements excluding lithium in the second positive electrode active material.

4. The non-aqueous electrolyte secondary battery according to claim 1, wherein an average particle diameter of primary particles in the first positive electrode active material is 500 nm or less, and is smaller than an average particle diameter of primary particles in the second positive electrode active material.

5. The non-aqueous electrolyte secondary battery according to claim 1, wherein the concentration of the lithium salt having an oxalate complex as an anion in the non-aqueous electrolyte is 0.01 mol/L to 0.2 mol/L.

6. The non-aqueous electrolyte secondary battery according to claim 1, wherein the lithium salt having an oxalate complex as an anion is lithium bis(oxalato)borate (Li[B(C_2O_4)_2]).

* * * * *